United States Patent
Yamada

(10) Patent No.: US 9,697,017 B2
(45) Date of Patent: Jul. 4, 2017

(54) CONFIGURING AND PROCESSING MANAGEMENT INFORMATION BASE (MIB) IN A DISTRIBUTED ENVIRONMENT

(71) Applicant: FUJI XEROX CO., LTD., Tokyo (JP)

(72) Inventor: Kentaro Yamada, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/790,078

(22) Filed: Jul. 2, 2015

(65) Prior Publication Data
US 2016/0216981 A1 Jul. 28, 2016

(30) Foreign Application Priority Data
Jan. 26, 2015 (JP) .................................. 2015-012057

(51) Int. Cl.
G06F 9/445 (2006.01)
(52) U.S. Cl.
CPC ................................ G06F 9/44526 (2013.01)
(58) Field of Classification Search
CPC ................................................. G06F 9/44526
USPC ................................... 717/168–178; 709/203
See application file for complete search history.

(56) References Cited

U.S. PATENT DOCUMENTS

| | | | |
|---|---|---|---|
| 6,052,724 A * | 4/2000 | Willie ............... | G06F 17/30067 707/999.01 |
| 6,311,321 B1 * | 10/2001 | Agnihotri ................. | G06F 8/20 709/220 |
| 6,434,619 B1 * | 8/2002 | Lim ..................... | H04L 41/0213 709/200 |
| 6,606,744 B1 * | 8/2003 | Mikurak ................. | H04L 29/06 717/174 |
| 6,760,761 B1 * | 7/2004 | Sciacca ................... | H04L 29/06 709/220 |
| 6,915,324 B1 * | 7/2005 | Allavarpu ........... | H04L 41/0213 709/200 |

(Continued)

FOREIGN PATENT DOCUMENTS

| | | |
|---|---|---|
| JP | 2009-223878 A | 10/2009 |
| JP | 2010-250561 A | 11/2010 |

OTHER PUBLICATIONS

Reiss "Plugging In and Into Code Bubbles", IEEE, pp. 55-60, 2012.*

(Continued)

*Primary Examiner* — Anil Khatri
(74) *Attorney, Agent, or Firm* — Sughrue Mion, PLLC

(57) ABSTRACT

There is provided an information processing apparatus for configuring and processing Management Information Base (MIB)Information in a Distributed Environment. The information processing apparatus adds a new function to the information processing apparatus as a plug-in, adds, as a Management Information Base (MIB) of Simple Network Management Protocol (SNMP), information concerning the new function added by the first adding unit in a management area in which MIBs other than standard MIBs are managed, receives an inquiry about a function of the information processing apparatus related to an MIB other than the standard MIB s, and controls a program that manages a plug-in for the function indicated by the inquiry to perform a process and return a result for the inquiry.

6 Claims, 6 Drawing Sheets

(56) References Cited

U.S. PATENT DOCUMENTS

| | | | | |
|---|---|---|---|---|
| 7,099,931 | B2* | 8/2006 | Da Palma | H02J 13/00 709/220 |
| 7,107,329 | B1* | 9/2006 | Schroder | G06F 8/67 709/221 |
| 7,246,159 | B2* | 7/2007 | Aggarwal | G06F 11/3495 709/220 |
| 7,412,701 | B1* | 8/2008 | Mitra | G06F 9/45504 709/223 |
| 7,509,638 | B2* | 3/2009 | Backhouse | G06F 8/60 717/176 |
| 7,793,285 | B2* | 9/2010 | Hattori | G06F 3/1204 709/203 |
| 8,019,849 | B1* | 9/2011 | Lopilato | G06F 17/302 709/203 |
| 8,095,925 | B2* | 1/2012 | Chamberlin | G06F 9/4411 717/168 |
| 8,261,260 | B2* | 9/2012 | Nagashima | G06F 9/4411 717/176 |
| 8,321,538 | B2* | 11/2012 | Ford | G06F 15/16 709/201 |
| 8,321,863 | B2* | 11/2012 | Yamaguchi | G06F 9/45558 717/170 |
| 8,533,331 | B1* | 9/2013 | Thaker | G06F 11/327 709/226 |
| 8,650,560 | B2* | 2/2014 | Seki | G06F 9/4411 717/176 |
| 8,793,366 | B2* | 7/2014 | Trebing | H04L 12/40006 709/203 |
| 8,880,636 | B2* | 11/2014 | Westberg | H04L 67/2847 709/203 |
| 8,959,120 | B2 | 2/2015 | Imamichi | |
| 2010/0269063 | A1 | 10/2010 | Takazawa | |

OTHER PUBLICATIONS

Gregersen et al, "Towards Dynamic Plug-in Replacement in Eclipse Plug-in Development", ACM, pp. 41-45, 2007.*
Hiremagalur et al, "WLAN Traffic Graphing Application Using Simple Network Management Protocol", ACM, pp. 151-159, 2005.*
Laouamri et al, "Enhancing Testability of System on Chips Using Network Management Protocols", IEEE, pp. 1-2, 2004.*
Lin et al, "Implementing SIP-Based Technology for Management Framework", ACM, pp. 1-7, 2008.*
Jun et al, "Automated Routing Protocol Selection in Mobile Ad Hoc Networks", ACM, pp. 906-913, 2007.*
Goldszmid, "Network Management Views using Delegated Agents", ACM, pp. 1-19, 1996.*

* cited by examiner

| INDEX | PLUG-IN ID | NAME | STATUS | TREE | STANDARD FLAG |
|---|---|---|---|---|---|
| 1: | COMPANY_A_P1: | at: | ready: | 1.3.6.1.2.1.3: | TRUE |
| 2: | COMPANY_B_P1: | LDAP: | ready: | 1: | FALSE |
| 3: | COMPANY_B_P2: | LocalUser: | ready: | 2: | FALSE |

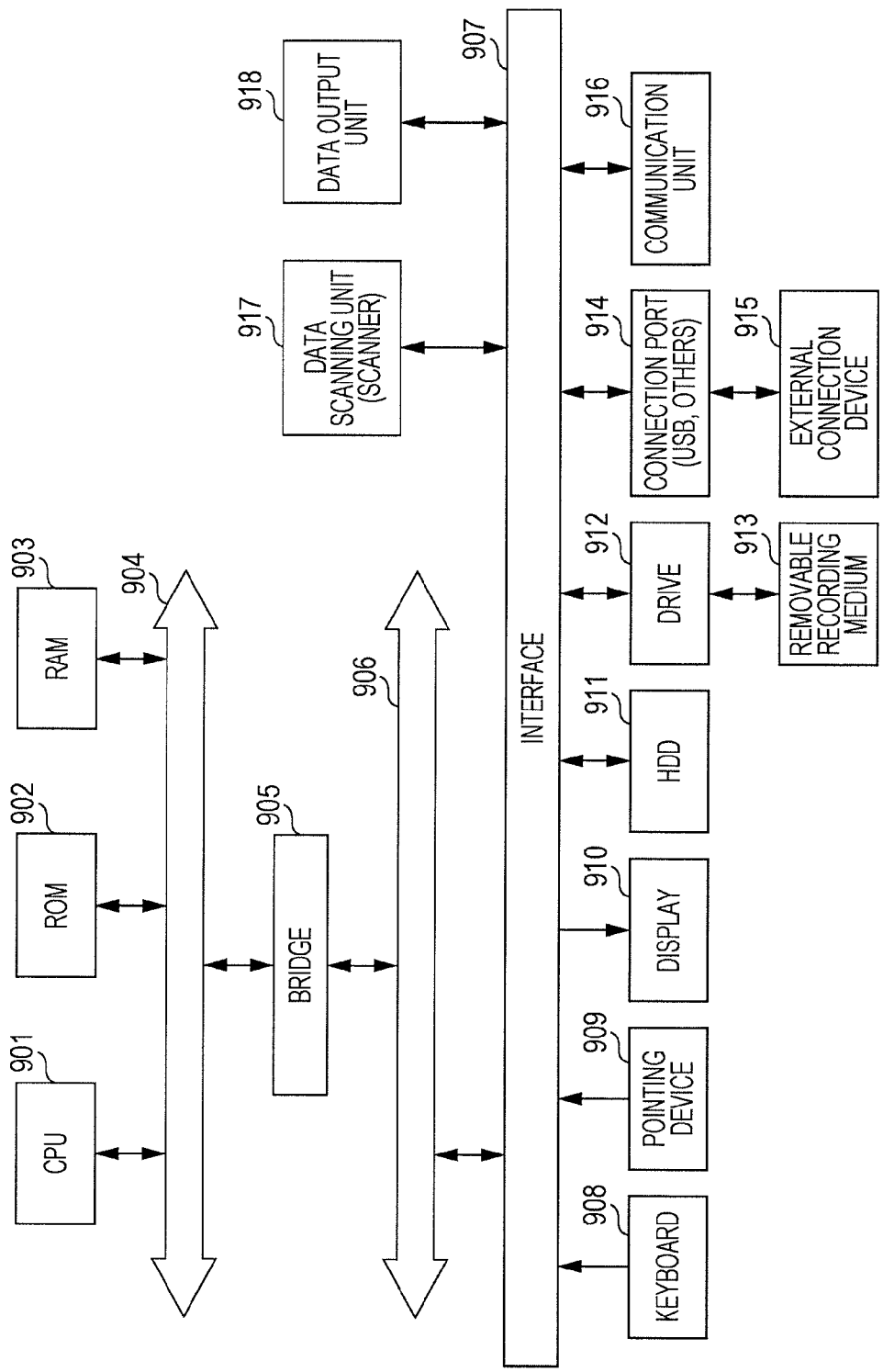

CONFIGURING AND PROCESSING MANAGEMENT INFORMATION BASE (MIB) IN A DISTRIBUTED ENVIRONMENT

CROSS-REFERENCE TO RELATED APPLICATIONS

This application is based on and claims priority under 35 USC 119 from Japanese Patent Application No. 2015-012057 filed Jan. 26, 2015.

BACKGROUND (i) Technical Field

The present invention relates to an information processing apparatus, a non-transitory computer readable medium, and an information processing method.

(ii) Related Art

Configuring information processing apparatuses to support standard Management Information Bases (MIBs) defined by Request for Comments (RFC) enables management (such as device status management or consumable supply management) to be performed in the same way even for the information processing apparatuses of different manufacturers. Specifically, supporting the standard MIBs makes it possible to obtain the statuses of management items by using the same command. Further, individual enterprises are permitted to add enterprise-specific MIBs and perform unique device management by using Simple Network Management Protocol (SNMP) which is a standard protocol. Note that an "MIB" is information which an SNMP-managed network device discloses in order to notify an external entity of its status. In addition, the "standard MIBs" are MIBs defined by RFC.

It is defined that enterprise-specific MIBs called private MIBs are added under an MIB tree assigned by Internet Assigned Number Authority (IANA) or Internet Corporation for Assigned Names and Numbers (ICANN).

Each enterprise discloses information concerning its private MIBs if necessary, and each vendor that develops an SNMP-based management application develops an MIB management application by using the disclosed information.

Accordingly, an MIB management application that manages devices of multiple manufacturers is developed by acquiring information concerning private MIBs from individual manufacturers if information to be managed is associated with the private MIBs.

SUMMARY

According to an aspect of the invention, there is provided an information processing apparatus including a first adding unit and a second adding unit. The first adding unit adds, as a plug-in, a new function to the information processing apparatus. The second adding unit adds, as an MIB of SNMP, information concerning the new function added by the first adding unit in a management area defined by a manufacturer of the information processing apparatus. The management area is an area in which MIBs other than standard MIBs are managed.

BRIEF DESCRIPTION OF THE DRAWINGS

An exemplary embodiment of the present invention will be described in detail based on the following figures, wherein:

FIG. 9 is a block diagram illustrating an example of a hardware configuration of a computer implementing the exemplary embodiment.

DETAILED DESCRIPTION

Prior to a description of an exemplary embodiment, the assumptions and an information processing apparatus according to the exemplary embodiment will be described first. Note that this description aims to make it easier to understand the exemplary embodiment. In addition, an image processing apparatus is described as an example of the information processing apparatus used; however, any apparatus (so-called network device) that is connectable to a communication network, for example, a mobile phone (including a smartphone), a mobile terminal, or a smart home appliance may be used as well as the image processing apparatus.

A suitable exemplary embodiment for implementing the present invention will be described below with reference to the accompanying drawings.

Figure 1:
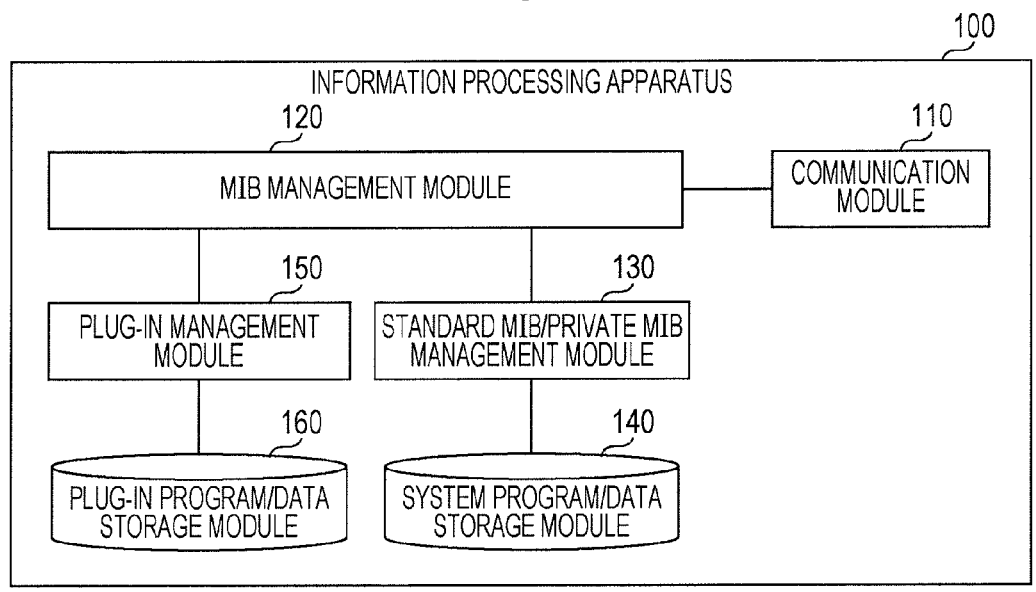
FIG. 1 is illustrates an example of a conceptual module configuration according to an exemplary embodiment.

FIG. 1 illustrates an example of a conceptual module configuration according to an exemplary embodiment.

In general, the term "module" refers to a logically separable component, such as a software component (a computer program) or a hardware component. Thus, the term "module" used in this exemplary embodiment indicates not only a module in a computer program but also a module in a hardware configuration. For this reason, the exemplary embodiment includes descriptions regarding a computer program causing a computer to function as the modules (such as a program causing a computer to execute each procedure, a program causing a computer to function as each unit, or a program causing a computer to implement each function), a system, and a method. For ease of explanation, the expressions "to store" and "to cause a device to store" and expressions equivalent thereto are used. When the exemplary embodiment is implemented as a computer program, these expressions indicate that the computer program causes a storage device to store information or the computer program performs control to cause a storage device to store information. Also, modules and functions may have one-to-one correspondences; however in implementations, one module may be constituted by one program, plural modules may be constituted by one program, or conversely one module may be constituted by plural programs. In addition, plural modules may be executed by one computer or one module may be executed by plural computers in a distributed or parallel environment. Moreover, one module may include another module. Hereinafter, the term "connection" is used to refer to physical connection and logical connection (such as data exchange or reference relations between instructions and between pieces of data). Further, the term "predetermined" indicates a state where something is decided prior to target processing. The term "predetermined" includes the meaning that something is decided in accordance with a state/status at that time or a state/status up to that point before and even after a process according to an exemplary embodiment starts as long as the decision is made prior to the target processing. In the case where plural "predetermined values" are used, the plural "predetermined values" may be different from each other or two or more values (which obviously include all values) may be the same. Moreover, the expression "if something is A, B is performed" is used to indicate that "it is determined whether or not something is A, and then B is performed if it is determined that something is A", except for the case where determination regarding whether or not something is A is not needed.

In addition, a system or an apparatus may be constituted by plural computers, plural hardware components, plural devices, or the like that are connected to each other via communication lines, such as networks (including one-to-one communication connections), or may be constituted by one computer, one hardware component, one device, or the like. The terms "apparatus" and "system" are used as synonyms to each other. Obviously, the "system" does not include a social "mechanism" (social system) that is an arrangement made by humans.

In each process performed by each module or in each of plural processes performed by a module, information is read from a storage device, the process is performed on the information, and the resulting information obtained from the process is written in the storage device. Thus, a description regarding reading information from the storage device performed prior to the process and writing information in the storage device subsequent to the process is occasionally omitted. Here, examples of the storage device may include a hard disk drive (HDD), a random access memory (RAM), an external storage medium, a storage device connected via a communication line, and registers included in a central processing unit (CPU).

A new function is added to an information processing apparatus 100 according to the exemplary embodiment in response to a request from an entity other than the developer of the information processing apparatus 100. As illustrated in FIG. 1, the information processing apparatus 100 includes a communication module 110, an MIB management module 120, a standard MIB/private MIB management module 130, a system program/data storage module 140, a plug-in management module 150, and a plug-in program/data storage module 160. The information processing apparatus 100 may be, for example, an image processing apparatus, such as a copier, a fax, a scanner, a printer, or a multifunctional peripheral (i.e., an image processing apparatus having two or more functions from among functions of a scanner, a printer, a copier, and a fax). Hereinafter, when a specific example is described, an image processing apparatus serves as the information processing apparatus 100 in such a specific example.

The communication module 110 is connected to the MIB management module 120. The communication module 110 communicates with another information processing apparatus, for example, an information processing apparatus that adds a new function to or deletes a function from the information processing apparatus 100 or an information processing apparatus that sends an inquiry about a function of the information processing apparatus 100. For example, the communication module 110 performs communication according to SNMP.

The MIB management module 120 is connected to the communication module 110, the standard MIB/private MIB management module 130, and the plug-in management module 150. Upon receiving an inquiry about a function of the information processing apparatus 100 from an external information processing apparatus via the communication module 110, the MIB management module 120 controls the plug-in management module 150, which is a program responsible for a function indicated by the inquiry, to perform a process if an MIB corresponding to the function is not the standard MIBs. That is, the MIB management module 120 performs a so-called dispatch process. The MIB management module 120 may control a program responsible for a function indicated by the inquiry to perform a process, in accordance with information added by the plug-in management module 150 to a management area. The standard MIBs may be, for example, the host name of the information processing apparatus 100, the installed location of the information processing apparatus 100, and the remaining amount of consumable supply of the information processing apparatus 100. Private MIBs are MIBs designed by the developer of the information processing apparatus 100. For example, in the case where the information processing apparatus 100 is an image processing apparatus, the private MIBs may be information concerning the counter of the information processing apparatus 100 or manufacturer-specific information used for maintenance or failure analysis.

In addition, the MIB management module 120 returns, via the communication module 110, a result of the process performed by the plug-in management module 150 to the external information processing apparatus that has sent the inquiry, as a response to the inquiry. Specifically, the inquiry about a function may be, for example, a command "set" or "get". Note that the term "plug-in" refers to an application program which is addable to the information processing apparatus 100.

Upon receiving an inquiry about a function of the information processing apparatus 100 from an external information processing apparatus via the communication module 110, the MIB management module 120 controls the standard MIB/private MIB management module 130, which is a program responsible for the function indicated by the inquiry, to perform a process if an MIB corresponding to the function is a standard MIB.

The standard MIB/private MIB management module 130 is connected to the MIB management module 120 and the system program/data storage module 140. The standard MIB/private MIB management module 130 manages standard MIBs based on SNMP. Specifically, the standard MIB/private MIB management module 130 performs a process of generating a response to an inquiry about a function corresponding to the MIB (i.e., an SNMP standard MIB or a private MIB of the information processing apparatus 100) and performs a process of exerting the function corresponding to the MIB.

The system program/data storage module 140 is connected to the standard MIB/private MIB management module 130. The system program/data storage module 140 is accessed by the standard MIB/private MIB management module 130 and stores information concerning SNMP standard MIBs.

The plug-in management module 150 is connected to the MIB management module 120 and the plug-in program/data storage module 160. The plug-in management module 150 adds a new function to the information processing apparatus 100 in response to a request from the developer of the information processing apparatus 100 or another entity. The plug-in management module 150 has a so-called plug-in function. The plug-in management module 150 also has a function of deleting the added function. The plug-in management module 150 performs a plug-in process and a deletion process using an existing technique. Note that "the developer of the information processing apparatus 100" may be a person (or people or a company) who has developed the information processing apparatus 100 and who has designed the tree structure in SNMP MIB in the information processing apparatus 100. Specifically, "the developer of the information processing apparatus 100" may be a manufacturer, for example. Examples of the "entity other than the developer of the information processing apparatus 100" include a vendor, specifically. Note that a function is added typically after the information processing apparatus 100 has been installed. The plug-in management module 150 adds, as an SNMP MIB, information concerning the added function to a management area for managing MIBs other than the standard MIBs, defined by the developer of the information processing apparatus 100.

Upon receiving an inquiry about a function managed by the plug-in management module 150, the plug-in management module 150 performs a process of returning a response to the inquiry under control of the MIB management module 120. The plug-in management module 150 returns a result of the process to the MIB management module 120.

The plug-in program/data storage module 160 is connected to the plug-in management module 150. The plug-in program/data storage module 160 is accessed by the plug-in management module 150 and stores information (such as an MIB) concerning a new function that has been added. The plug-in program/data storage module 160 also stores a program of the added function.

Figure 2:
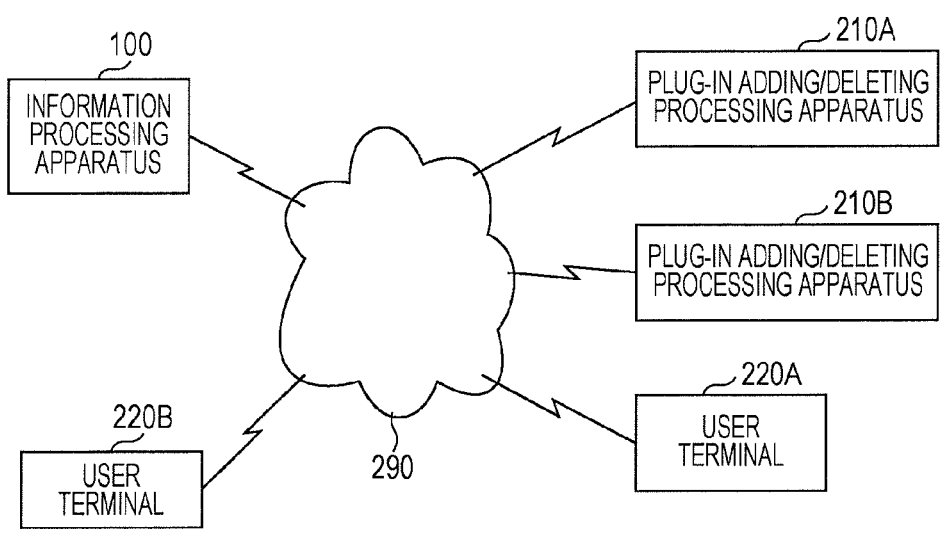
FIG. 2 illustrates an example of a configuration of a system utilizing the exemplary embodiment.

FIG. 2 illustrates an example of a system configuration utilizing the exemplary embodiment.

The information processing apparatus 100, plug-in adding/deleting processing apparatuses 210A and 210B (correctively referred to as plug-in adding/deleting processing apparatuses 210 if distinction between them is not required), and user terminals 220A and 220B (collectively referred to as user terminals 220 if distinction between them is not required) are connected to one another via a communication network 290. The communication network 290 may be a wireless or wired network or a partially-wired-and-partially-wireless network. For example, the communication network 290 may be a communication infrastructure, such as the Internet or an intranet.

Each of the plug-in adding/deleting apparatuses 210, which is operated by a vendor or the like, adds a new function to or deletes a function from the information processing apparatus 100. For example, a plug-in may be added to the information processing apparatus 100 by being downloaded from a server storing the plug-in.

Each of the user terminals 220, which is operated by a user who uses functions of the information processing apparatus 100, requests the information processing apparatus 100 to perform a process, and is a so-called client or the like. For example, the user terminal 220 manages the information processing apparatus 100 by obtaining information such as information concerning SNMP standard MIBs and information concerning an MIB corresponding to a function added by the plug-in adding/deleting processing apparatus 210.

Figure 8:
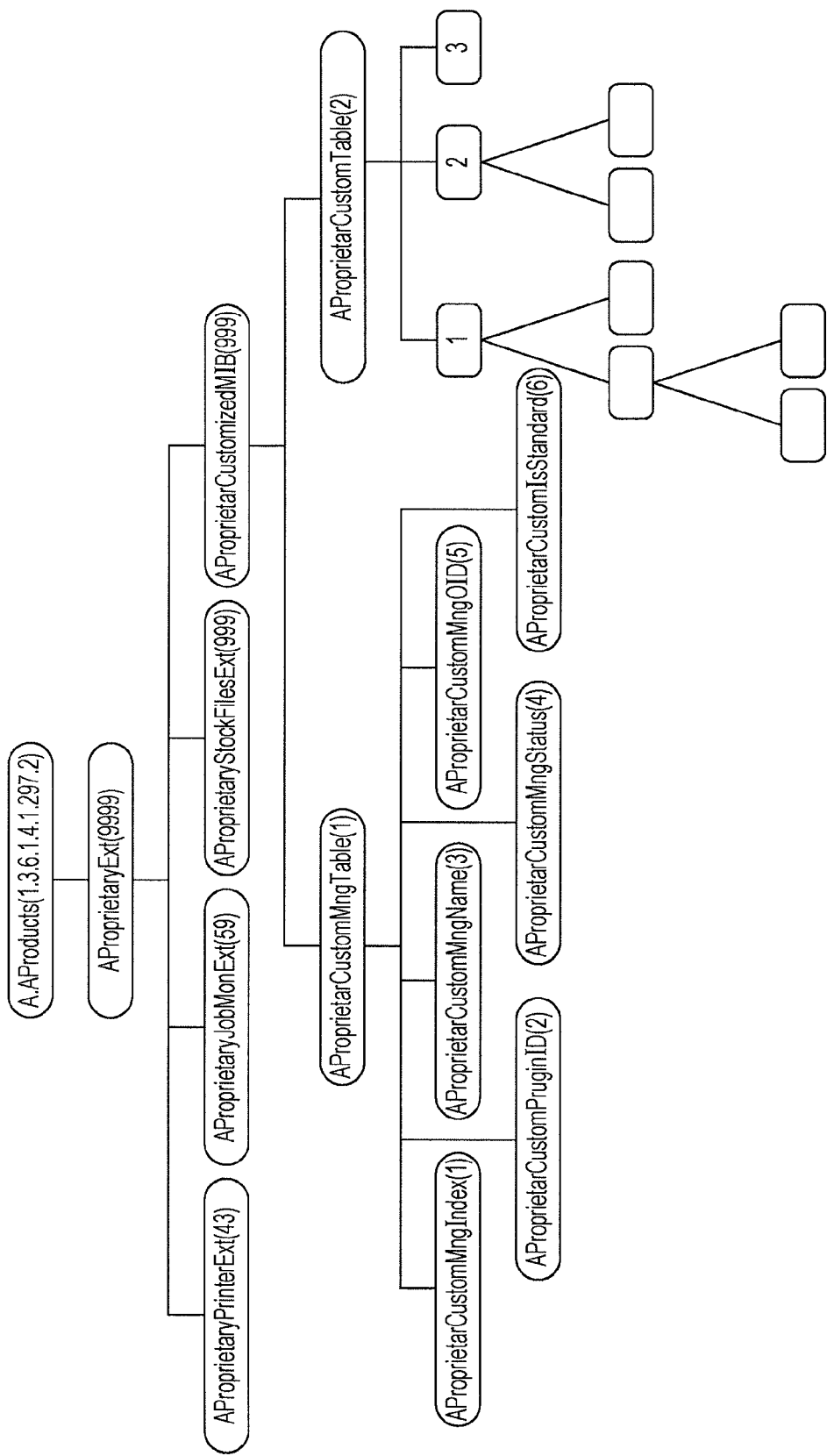
FIG. 8 illustrates an example of a structure of an MIB tree.

FIG. 8 illustrates an example of the structure of an MIB tree. Note that "A" in the node name denotes the name of the manufacturer.

In this MIB tree, "A.AProducts(1.3.6.1.4.1.297.2)" is the root of this tree and has a child node "AProprietaryExt (9999)". The node "AProprietaryExt(9999)" has child nodes "AProprietaryPrinterExt(43)", "AProprietaryJobMonExt (59)", "AProprietaryStockFilesExt(999)", and "AProprietarCustomizedMIB(999)". The node "AProprietarCustomizedMIB(999)" has child nodes "AProprietarCustomMngTable(1)" and "AProprietarCustomTable(2)". The node "AProprietarCustomMngTable(1)" has child nodes "AProprietarCustomMngIndex(1)", "AProprietarCustomPruginID(2)", "AProprietarCustomMngName(3)", "AProprietarCustomMngStatus(4)", "AProprietarCustomMngOID(5)", and "AProprietarCustomIsStandard(6)". The node "AProprietarCustomTable(2)" has child nodes "1", "2", and "3".

In this MIB tree, a tree starting from the "APRoprietarCustomizedMIB(999)" is a tree of private MIBs of the manufacturer A. Under the node "AProprietarCostomizedMIB(999)", there are a tree starting from "AProprietarCustomMgnTable(1)" for private MIBs of the information processing apparatus 100 that have been designed by the manufacturer A and a tree starting from "AProprietarCustomTable(2)" for MIBs of plug-ins (programs) created by vendors.

For example, a plug-in MIB management table 700 is stored under "AProprietarCustomMngTable(1)".

That is, actual data of setting information of the MIB added by the customization function is added under "AProprietarCustomTable(2)" in accordance with a plug-in procedure, and additional information (e.g., the plug-in MIB management table 700) is stored at "AProprietarCustomMngTable(1)".

The tree is constructed in accordance with the order of addition. Thus, an MIB inquiry process obtains location information in the tree from "AProprietarCustomMngTable (1)" (i.e., the plug-in MIB management table 700) and then accesses the location indicated by the location information.

In response to an inquiry about (access to) an MIB located under the tree starting from "AProprietarCusotomTable(2)", the MIB management module 120 controls the plug-in management module 150 to perform a process.

An area prepared in advance (a tree under "AProprietarCustomTable(2)" defined by the manufacturer A) is allocated to an MIB concerning an added plug-in program in the order of addition. If a tree area is insufficient when a plug-in program is added, an error occurs and addition of the plug-in program is not permitted.

Figure 3:
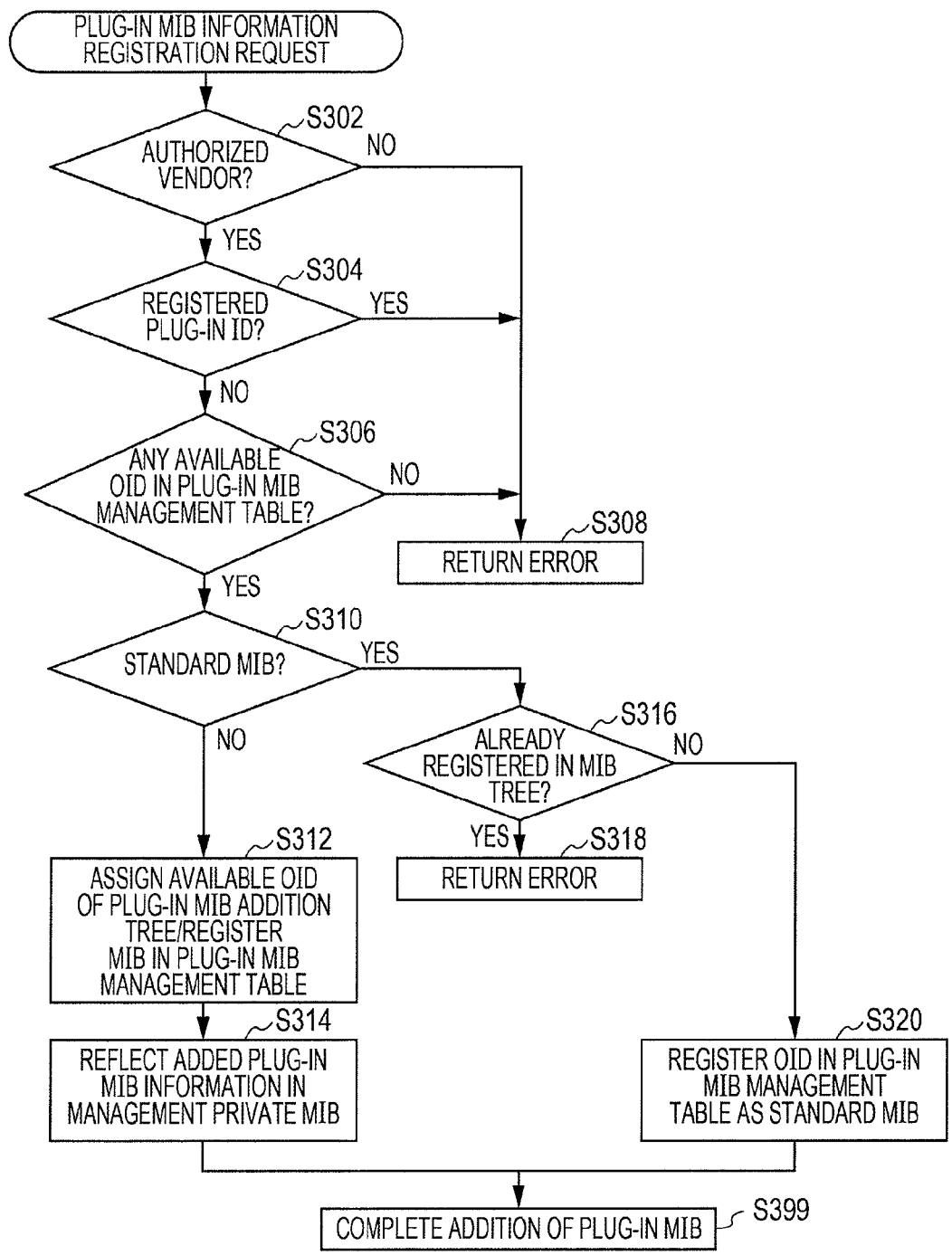
FIG. 3 is a flowchart illustrating an example of a process according to the exemplary embodiment.

FIG. 3 is a flowchart illustrating an example of a process according to the exemplary embodiment. This flowchart illustrates an example of a process of registering MIB information from the plug-in adding/deleting processing apparatus 210. It is assumed that a process of adding a plug-in has already ended.

In step S302, it is determined whether the plug-in adding/deleting processing apparatus 210 that has sent a registration request is an authorized vendor. If so, the process proceeds to step S304; otherwise, the process proceeds to step S308. In step S302, it is determined whether an entity that attempts to add a plug-in is authorized by the manufacturer of the information processing apparatus 100 in order to ban plug-ins provided by unauthorized entities (including malicious entities). Specifically, this determination is made in the following manner. A list for managing registered vendors is prepared in advance, and it is determined whether an entity that has sent a registration request is included in the list.

Figures 6, 7:
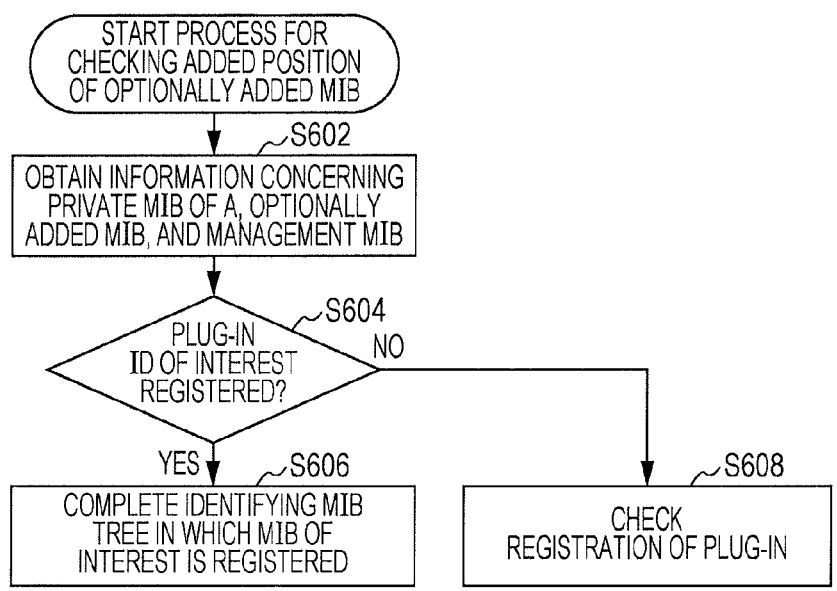
FIG. 6 is a flowchart illustrating an example of a process according to the exemplary embodiment.
FIG. 7 illustrates an example of a data structure of a plug-in MIB management table.

In step S304, it is determined whether a plug-in identification (ID) has not been registered. If the plug-in ID has not been registered, the process proceeds to step S306; otherwise, the process proceeds to step S308. The plug-in ID is an identifier uniquely assigned by the vendor in order to distinguish individual plug-ins from one another. Specifically, it is determined whether the plug-in ID is included in the plug-in MIB management table 700 prepared in advance. FIG. 7 illustrates an example of a data structure of the plug-in MIB management table 700. The plug-in MIB management table 700 includes an index field 710, a plug-in ID field 720, a name field 730, a status field 740, a tree field 750, and a standard flag field 760. The index field 710 stores the index. The plug-in ID field 720 stores information (plug-in ID) that uniquely identifies the added program in this exemplary embodiment. The name field 730 stores the name of the program. The status field 740 stores status information indicating whether an MIB tree corresponding to the program is ready for use. The tree field 750 stores the location of the MIB corresponding to the program in the MIB tree. The standard flag field 760 stores a flag indicating whether the MIB is an SNMP standard MIB. If this flag is set to FALSE, the MIB is an MIB concerning a program created by a vender. Specifically, the MIB is stored under the tree starting from "AProprietarCustomTable(2)" in FIG. 8 described before.

In step S306, it is determined whether the plug-in MIB management table 700 has an available entry. If there is an available entry, the process proceeds to step S310; otherwise, the process proceeds to S308.

In step S308, an error is returned to the plug-in adding/deleting processing apparatus 210 that has sent the registration request.

In step S310, it is determined whether the MIB to be registered is a standard MIB. If the MIB to be registered is a standard MIB, the process proceeds to step S316; otherwise, the process proceeds to step S312.

In step S312, an available object identifier (OID) of a plug-in MIB addition tree (subtree of the MIB tree) is assigned to the MIB, and the MIB is registered in the plug-in MIB management table 700. Specifically, actual setting data regarding "LDAP:" assigned an index of 2 in the plug-in MIB management table 700 illustrated in FIG. 7 is added under the node "2" of the tree starting from the "AProprietarCustomTable(2)" illustrated in FIG. 8, as described above. In this case, the OID used in an inquiry from outside is, for example, "1.3.6.1.2.1.3:9999:999:2:1". The plug-in MIB management table 700 manages information "1.3.6.1.2.1.3:9999:999:2:1" but does not manage which location subsequent to the ID "2" the information concerning "LDAP:" is registered. OIDs subsequent to the ID "2" are managed by each plug-in. Accordingly, a request to obtain the MIB information is sent to the plug-in.

In step S314, information on the added plug-in MIB is reflected in management private MIBs. Specifically, information indicating that the information concerning the plug-in assigned the index of 2 has been registered under the node "2" of the tree is registered in the plug-in MIB management table 700 illustrated in FIG. 7.

In step S316, it is determined whether the MIB to be registered is already registered in the MIB tree. If the MIB to be registered is already registered in the MIB tree, the process proceeds to step S318; otherwise, the process proceeds to step S320.

In step S318, an error is returned. In step S318, an error is returned if an attempt to register an already registered standard MIB is made; however, the MIB may be registered in the plug-in MIB management table 700. In this case, even if an inquiry is about a standard MIB, the inquiry may be transferred to the plug-in management module 150 without performing a get/set process by the standard MIB/private MIB management module 130. For example, this configuration enables utilization, such as bug fix or customization of the standard MIB.

In step S320, the OID is registered as the standard MIB in the plug-in MIB management table 700.

In step S399, addition of the plug-in MIB completes.

Figure 4:
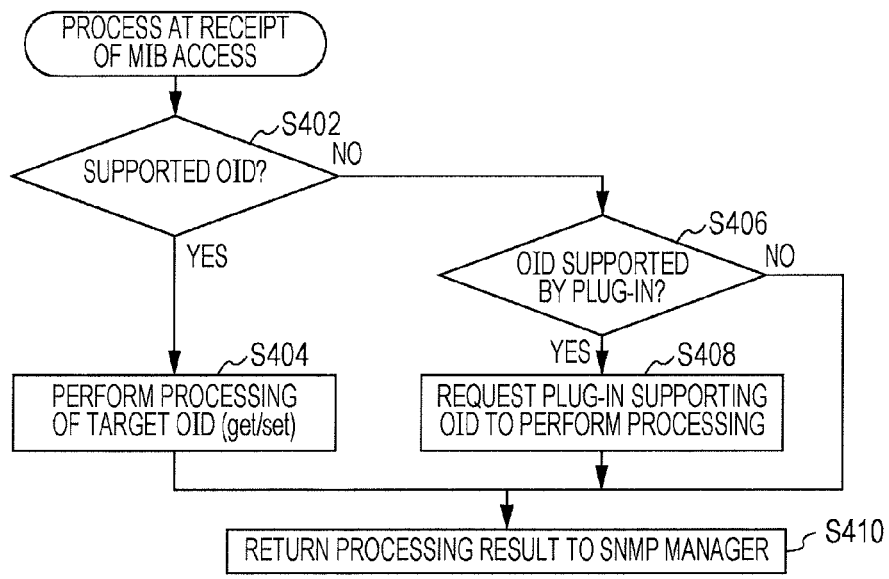
FIG. 4 is a flowchart illustrating an example of a process according to the exemplary embodiment.

FIG. 4 is a flowchart illustrating an example of a process performed by the MIB management module 120 according to the exemplary embodiment. This flowchart illustrates an example of a process performed when the information processing apparatus 100 receives an MIB access request from the user terminal 220. Specifically, the flowchart illustrates a process performed when an OID is received from the user terminal 220 through a "get" command.

In step S402, the MIB management module 120 determines whether the OID in the received access request is an OID supported by the information processing apparatus 100. If the OID is a supported OID, the process proceeds to step S404; otherwise, the process proceeds to step S406.

In step S404, the MIB management module 120 performs a requested (get/set) process for the OID.

In step S406, the MIB management module 120 determines whether the OID in the received access request is an OID supported by the plug-in management module 150. If the OID is supported by the plug-in side, the process proceeds to step S408; otherwise, the process proceeds to step S410. Specifically, for example, in the case where the OID subjected to the inquiry is "1.3.6.1.2.1.3:9999:999:2:1", the MIB management module 120 follows the tree from the root to the node "1.3.6.1.2.1.3:9999:999:2" and determines that the OID is managed by a plug-in "Company_B_P1" by referring to the plug-in MIB management table 700. The MIB management module 120 then requests the plug-in "Company_B_P1" to perform a process of obtaining the MIB information.

In step S408, the MIB management module 120 requests the plug-in (a program added as a function) supporting the OID to perform a process. The process performed by the requested plug-in will be described later using an example illustrated in FIG. 5.

In step S410, the processing result is returned to an SNMP manager (i.e., the MIB management module 120). Then, the SNMP manager returns the processing result to the user terminal 220 that has sent the inquiry. In the case of NO in step S406, a massage indicating that the OID is not found is returned.

Figure 5:
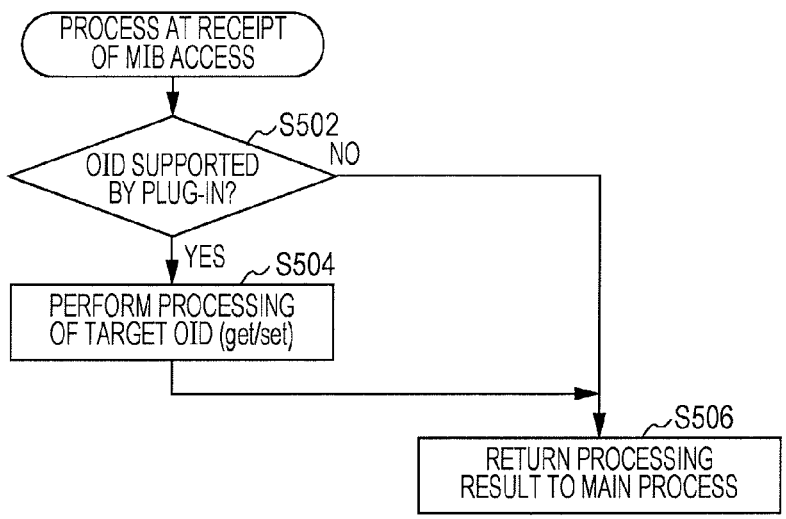
FIG. 5 is a flowchart illustrating an example of a process according to the exemplary embodiment.

FIG. 5 is a flowchart illustrating an example of a process according to the exemplary embodiment. This flowchart illustrates an example of a process performed by a plug-in that is requested to perform a process in step S408.

In step S502, the plug-in determines whether it supports the OID. If the plug-in supports the OID, the process proceeds to step S504; otherwise, the process proceeds to step S506.

In step S504, the plug-in performs a requested (get/set) process for the OID.

In step S506, the plug-in returns the processing result to the main process (step S410). In the case of NO in step S502, a massage indicating that the OID is not found is returned.

FIG. 6 is a flowchart illustrating an example of a process according to the exemplary embodiment. This flowchart illustrates an example of a process performed by the SNMP manager (i.e., the MIB management module 120) to check where an MIB has been added. In order to manage an added MIB, it is necessary for a program created by a vender that attempts to manage plug-ins or the MIB management module 120 to grasp a structure of the MIB added to the information processing apparatus 100.

Accordingly, the process illustrated in this flowchart allows the MIB management module 120 to grasp the tree structure of the added MIB. An MIB is added under a specific tree of private MIBs of the manufacturer A of the information processing apparatus 100. If the OIDs to the added tree are successfully identified, the SNMP Manager (i.e., the MIB management module 120) successfully accesses the added MIB.

In step S602, the private MIBs of the manufacturer A, optionally added MIBs, and management MIB information are obtained. Specifically, these pieces of information are obtained by using the plug-in MIB management table 700.

In step S604, it is determined whether the plug-in ID of interest is registered. If the plug-in ID of interest is registered, the process proceeds to step S606; otherwise, the process proceeds to step S608.

In step S606, the MIB tree in which the MIB of interest is registered is identified, and then the process ends. Specifically, the MIB tree is identified by using the location in the tree which is stored in the tree field 750 of the plug-in MIB management table 700.

In step S608, a process of checking registration of the plug-in is performed. Because the plug-in ID of interest is not registered, the process is performed to check whether registration of the plug-in has been successful. Depending on the type of the information processing apparatus 100 and a plug-in addition state, an MIB to be added is not necessarily added using the same OID as that of the program of the plug-in. In such a case, a process may be performed in the following manner. A new OID is added, and then the added OID is changed to the same OID as that of the program of the plug-in. In this way, the OIDs are made identical.

Referring to FIG. 9, an example of a hardware configuration of the information processing apparatus 100 according to the exemplary embodiment will be described. The configuration illustrated in FIG. 9 is implemented by, for example, a personal computer (PC) and is an exemplary hardware configuration including a data scanning unit 917, such as a scanner, and a data output unit 918, such as a printer.

A CPU 901 is a controller that executes a process in accordance with a computer program which describes execution sequences of the various modules described in the exemplary embodiment above, that is, various modules such as the communication module 110, the MIB management module 120, the standard MIB/private MIB management module 130, and the plug-in management module 150.

A read-only memory (ROM) 902 stores a program and operation parameters used by the CPU 901, for example. A RAM 903 stores a program being executed by the CPU 901 and parameters that change accordingly during the execution, for example. The CPU 901, the ROM 902, and the RAM 903 are connected to one another via a host bus 904, such as a CPU bus.

The host bus 904 is connected to an external bus 906, such as a peripheral component interconnect/interface (PIC) bus, via a bridge 905.

A keyboard 908 and a pointing device 909, such as a mouse, are input devices operated by an operator. A display 910, such as a liquid crystal display or a cathode ray tube (CRT) display, displays various kinds of information using text or an image.

An HDD 911 includes a hard disk and drives the hard disk to record or reproduce a program executed by the CPU 901 or information. The hard disk implements functions of the system program/data storage module 140 and the plug-in program/data storage module 160, for example. The hard disk further stores other information, such as various kinds of data and various computer programs.

A drive 912 reads data or a program stored on a removable recording medium 913 mounted thereto, such as a magnetic disk, an optical disc, a magneto-optical disk, or a semiconductor memory; and provides the data or program to the RAM 903 connected thereto via an interface 907, the external bus 906, the bridge 905, and the host bus 904. The removable recording medium 913 may also be used as a data storage area just like the hard disk.

A connection port 914 is a port to which an external connection device 915 is to be connected and has a port based on Universal Serial Bus (USB) or Institute of Electrical and Electronics Engineers (IEEE) 1394. The connection port 914 is connected to the CPU 901 via the interface 907, the external bus 906, the bridge 905, and the host bus 904. A communication unit 916 is connected to a communication network and performs a process to communicate with an external apparatus. The data scanning unit 917, for example, a scanner, performs a document scanning process. The data output unit 918, for example, a printer, performs a document data output process.

The hardware configuration of the information processing apparatus 100 illustrated in FIG. 9 merely illustrates a configuration example, and the hardware configuration used in the exemplary embodiment is not limited to the configuration illustrated in FIG. 9. The hardware configuration may be any configuration that enables execution of the modules described in the exemplary embodiment. For example, some of the modules may be implemented by dedicated hardware (e.g., an application specific integrated circuit (ASIC)), or may reside on an external system and may be connected to the information processing apparatus 100 via the communication network. Further, plural systems illustrated in FIG. 9 may be connected to one another via the communication network and operate in cooperation with one another. The configuration may be incorporated into a mobile information communication device (such as a mobile phone, a smartphone, a mobile terminal, or a wearable computer), a smart home appliance, a copier, a fax, a scanner, a printer, or a multifunction peripheral as well as the PC.

The described program may be provided after being stored on a recording medium or may be provided via a communication network. In such a case, for example, the described program may be regarded as the invention related to a "computer readable recording medium storing a program".

The "computer readable recording medium storing a program" is a computer readable recording medium storing a program that is used for installing and executing the program, for distribution of the program, and so forth.

Examples of the recording medium include Digital Versatile Discs (DVDs), such as "DVD-R, DVD-RW, and DVD-RAM" based on standards decided by DVD Forum and "DVD+R and DVD+RW" based on standards decided by DVD+RW; Compact Discs (CDs), such as CD-ROM, CD-recordable (CD-R), and CD-rewritable (CD-RW); Bluray Discs (registered trademark); magneto-optical disks (MOs); flexible disks (FDs); magnetic tapes; hard disks; ROMs; electrically erasable programmable ROMs (EEPROMs (registered trademark)); flash memories; RAMs; and secure digital (SD) memory cards.

The program or part of the program may be recorded on the recording media for storage or distribution. Also, the program or part of the program may be transmitted by communication using a transmission medium, for example, a wired network, a wireless communication network, or a combination thereof that is used in a local area network (LAN), a metropolitan area network (MAN), a wide area network (WAN), the Internet, an intranet, or an extranet; or may be propagated over carrier waves.

Moreover, the program may be part of another program or may be recorded on a recording medium together with other individual programs. Alternatively, the program may be divided and portions of the program may be recorded on plural recording media. The program may be recorded in any restorable form, such as a compressed or encrypted form.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to execute:
a first adding unit configured to add, as a plug-in, a new function to the information processing apparatus;
a second adding unit configured to add, as a Management Information Base (MIB) of Simple Network Management Protocol (SNMP), information concerning the new function added by the first adding unit in a management area defined by a manufacturer of the information processing apparatus, the management area being an area in which MIBs other than standard MIBs are managed;
a controller configured to control, in a case where an inquiry about a function of the information processing apparatus related to the MIB other than the standard MIBs is received from outside, a program that manages a plug-in for the function indicated by the inquiry to perform a process and return a result for the inquiry; and
an answering unit configured to return, as an answer to the inquiry, the result of the process performed by the program that manages the plug-in; and
a memory that stores, by using a tree structure, information that identifies the MIB concerning the plug-in and stores information concerning nodes as far as a specific node in the tree structure.

2. The information processing apparatus according to claim 1, wherein the processor is further configured to execute:
a receiving unit configured to receive, from outside, an MIB acquisition request which uses information that identifies the MIB concerning the plug-in; and
a returning unit configured to return an object identifier of the MIB concerning the plug-in upon the receiving unit receiving the MIB acquisition request.

3. The information processing apparatus according to claim 1, wherein the controller causes the plug-in to perform a process, in accordance with the information stored in the memory.

4. A non-transitory computer readable medium storing a program causing a computer to execute a process for information processing, the process comprising:
adding, as a plug-in, a new function to an information processing apparatus;
adding, as a Management Information Base (MIB) of Simple Network Management Protocol (SNMP), information concerning the added new function in a management area defined by a manufacturer of the information processing apparatus, the management area being an area in which MIBs other than standard MIBs are managed;
controlling, in a case where an inquiry about a function of the information processing apparatus related to the MIB other than the standard MIBs is received from outside, a program that manages a plug-in for the function indicated by the inquiry to perform a process and return a result for the inquiry;
storing in a memory, by using a tree structure, information that identifies the MIB concerning the plug-in and stores information concerning nodes as far as a specific node in the tree structure; and
returning, as an answer to the inquiry, the result of the process performed by the program that manages the plug-in.

5. The non-transitory computer readable medium according to claim 4,
wherein the program is controlled in accordance with the information in the management area.

6. An information processing method comprising:
adding, by at least one processor, as a plug-in, a new function to an information processing apparatus;
adding, by the at least one processor, as a Management Information Base (MIB) of Simple Network Management Protocol (SNMP), information concerning the added new function in a management area defined by a manufacturer of the information processing apparatus, the management area being an area in which MIBs other than standard MIBs are managed;
controlling, in a case where an inquiry about a function of the information processing apparatus related to the MIB other than the standard MIBs is received from outside, a program that manages a plug-in for the function indicated by the inquiry to perform a process and return a result for the inquiry;
storing in a memory, by using a tree structure, information that identifies the MIB concerning the plug-in and stores information concerning nodes as far as a specific node in the tree structure; and
returning, as an answer to the inquiry, the result of the process performed by the program that manages the plug-in.

* * * * *